(12) United States Patent
Sugimoto

(10) Patent No.: US 7,970,271 B2
(45) Date of Patent: Jun. 28, 2011

(54) BRIGHTNESS CORRECTION APPARATUS FOR MOVING IMAGES, AND METHOD AND PROGRAM FOR CONTROLLING SAME

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1162 days.

(21) Appl. No.: 11/709,173

(22) Filed: Feb. 22, 2007

(65) Prior Publication Data
US 2007/0196098 A1    Aug. 23, 2007

(30) Foreign Application Priority Data

Feb. 23, 2006  (JP) .................. 2006-046104

(51) Int. Cl.
G03B 17/00    (2006.01)
G03B 7/00    (2006.01)
(52) U.S. Cl. .............. 396/153; 396/213; 348/364
(58) Field of Classification Search .......... 396/234, 396/322, 153, 213; 348/364–365
See application file for complete search history.

(56) References Cited

U.S. PATENT DOCUMENTS

| | | | |
|---|---|---|---|
| 5,359,385 A | * | 10/1994 | Ishida et al. ........... 396/49 |
| 5,544,239 A | * | 8/1996 | Golin et al. ........... 382/236 |
| 6,836,288 B1 | * | 12/2004 | Lewis ........... 348/229.1 |
| 7,593,633 B2 | * | 9/2009 | Okamoto ........... 396/222 |

FOREIGN PATENT DOCUMENTS

| | | | | |
|---|---|---|---|---|
| JP | 06133300 A | * | 5/1994 | |
| JP | 2003-107555 A | | 4/2003 | |
| JP | 2003-259231 A | | 9/2003 | |
| JP | 2005-159650 A | | 6/2005 | |
| JP | 2005-204195 A | | 7/2005 | |
| JP | 2006-235401 A | | 9/2006 | |
| JP | 2007228200 A | * | 9/2007 | |
| JP | 2008263253 | * | 10/2008 | |

* cited by examiner

*Primary Examiner* — Christopher Mahoney
(74) *Attorney, Agent, or Firm* — Birch, Stewart, Kolasch & Birch, LLP.

(57) ABSTRACT

In order to perform a brightness correction that is suited to a face image in a moving image, a still-image brightness correction parameter for performing a brightness correction suited to a subject image is calculated from a face image in the subject image and the overall subject image. A moving-image brightness correction parameter is calculated using the calculated still-image brightness correction parameter and a moving-image brightness correction parameter that has been calculated in a subject image of a previous frame. By using the moving-image brightness correction parameter calculated, the brightness of a subject image obtained subsequent to the first-mentioned subject image is corrected.

10 Claims, 13 Drawing Sheets

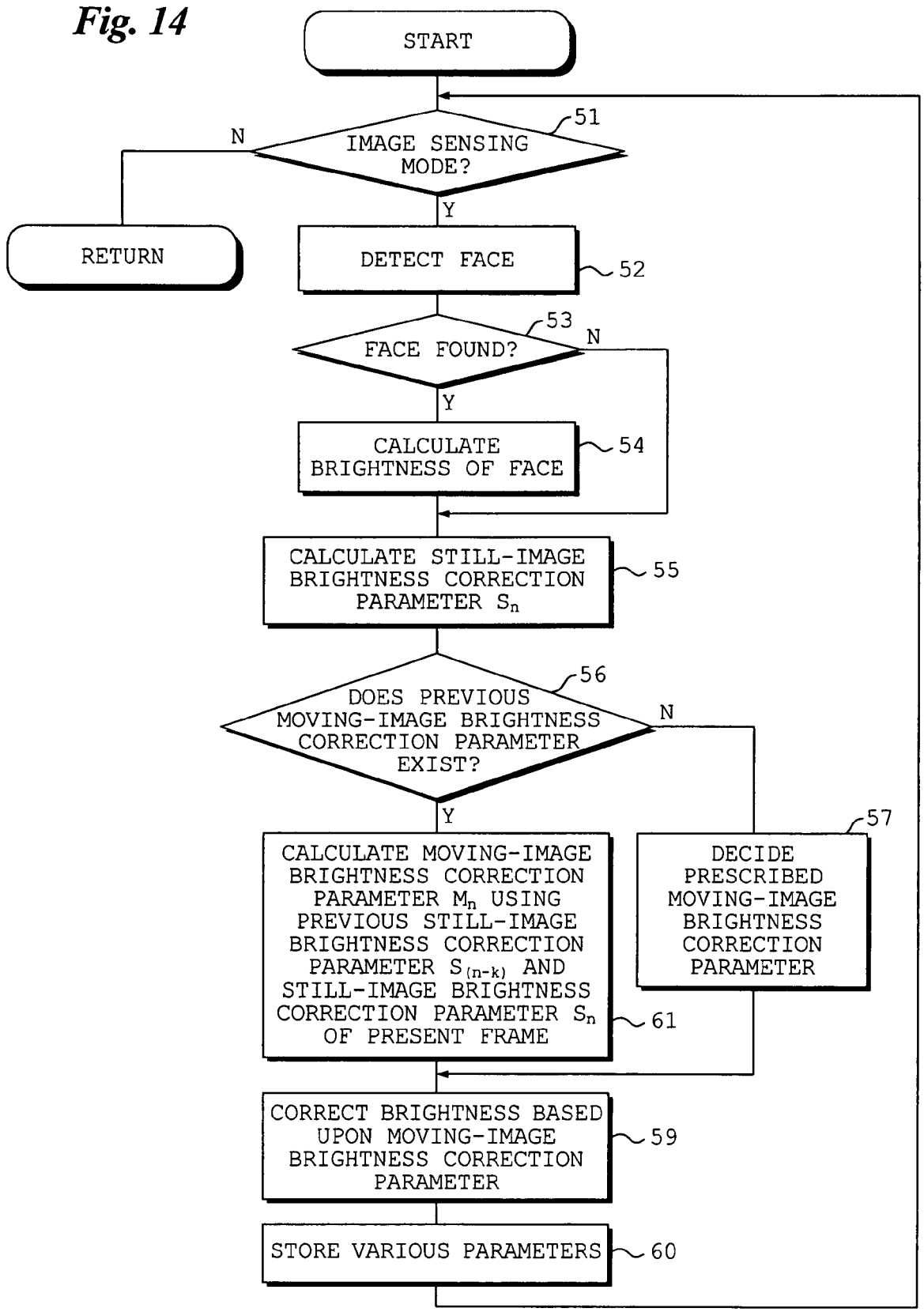

BRIGHTNESS CORRECTION APPARATUS FOR MOVING IMAGES, AND METHOD AND PROGRAM FOR CONTROLLING SAME

BACKGROUND OF THE INVENTION

1. Field of the Invention

This invention relates to an apparatus for correcting the brightness of a moving image, and to a method and program for controlling this apparatus.

2. Description of the Related Art

When the image of a subject is sensed, a tone correction is performed in such a manner that the portion of the image of the subject that is the main subject image will have an appropriate brightness (see the specification of Japanese Patent Application Laid-Open No. 2005-159650). However, this correction is premised on the image being a still image and does not take moving images into consideration.

Further, although there is prior art that applies a tone correction to a moving image (see the specification of Japanese Patent Application Laid-Open No. 2005-204195), this does not take into account a specific target-image portion of the image of a subject, such as a face image. Consequently, there are occasions where a specific target-image portion appears too dark.

SUMMARY OF THE INVENTION

Accordingly, an object of the present invention is to so arrange it that a specific target-image portion (the portion of an image that is the face or an eye, etc.) will take on a comparatively appropriate brightness even in a moving image.

According to the present invention, the foregoing object is attained by providing an apparatus for correcting brightness of a moving image, comprising: a target image detecting device for detecting a target-image portion from within one subject image constituting a number of frames of subject images applied in succession one frame at a time at a fixed period; a still-image brightness correction parameter calculating device for calculating a still-image brightness correction parameter based upon brightness of the target-image portion detected by the target image detecting device; an adjustment parameter calculating device for calculating an adjustment parameter, which adjusts the still-image brightness correction parameter calculated by the still-image brightness correction parameter calculating device, based upon another subject image preceding the one subject image; a moving-image brightness correction parameter calculating device for calculating a moving-image brightness correction parameter by adjusting the still-image brightness correction parameter, which has been calculated by the still-image brightness correction parameter, using the adjustment parameter calculated by the adjustment parameter calculating device; and a brightness correcting device for correcting the brightness of a correction-target subject image, which is subsequent to the one subject image, using the moving-image brightness correction parameter calculated by the moving-image brightness correction parameter calculating device.

The present invention also provides a control method suited to the above-described apparatus for correcting brightness of a moving image. Specifically, the present invention provides a method of controlling an apparatus for correcting brightness of a moving image, the method comprising the steps of: detecting a target-image portion from within one subject image constituting a number of frames of subject images applied in succession one frame at a time at a fixed period; calculating a still-image brightness correction parameter based upon brightness of the target-image portion detected; adjusting the calculated still-image brightness correction parameter based upon another subject image preceding the one subject image; calculating a moving-image brightness correction parameter by adjusting the calculated still-image brightness correction parameter using the adjustment parameter calculated; and correcting the brightness of a correction-target subject image, which is subsequent to the one subject image, using the moving-image brightness correction parameter calculated.

The present invention also provides a program for implementing the control method described above.

According to the present invention, a number of frames of subject images are applied in succession one frame at a time at a fixed period, and a target-image portion is detected from within one subject image. A still-image brightness correction parameter is calculated based upon the brightness of the target-image portion detected. On the basis of another subject image earlier than the one subject image, an adjustment parameter for adjusting (correcting) the still-image brightness correction parameter is calculated. A moving-image correction parameter is calculated by adjusting the still-image brightness correction parameter using the adjustment parameter calculated. The brightness of a correction-target subject image, which is later than the one subject image, is corrected using the moving-image correction parameter that has been calculated. Thus, the brightness of the correction-target subject image is corrected taking into consideration the brightness of the subject image of a preceding frame and the brightness of the target-image portion. The target-image portion of the correction-target subject image takes on a comparatively appropriate brightness, and it is possible to prevent a sudden change in brightness also in a case where a moving image is viewed as a whole.

The adjustment parameter calculating device calculates the moving-image correction parameter, which is obtained based upon the other subject image, by way of example. The moving-image correction parameter calculated previously is used as the adjustment parameter.

The adjustment parameter calculating device may calculate the still-image brightness correction parameter, which is calculated based upon the brightness of the target-image portion in the other subject image. The still-image brightness correction parameter calculated previously is used as the adjustment parameter.

It is preferred that the moving-image brightness correction parameter, which is calculated by the moving-image brightness correction parameter calculating device, fall within a fixed range that starts from the adjustment parameter calculated by the adjustment parameter calculating device. This makes it possible to prevent a sudden fluctuation in brightness.

The still-image brightness correction parameter calculating device may calculate the still-image brightness correction parameter based upon the brightness of the target-image portion and the brightness of the overall one subject image. Thus, the still-image brightness correction parameter is calculated taking the brightness of the overall subject image into consideration.

The still-image brightness correction parameter calculating device may calculate the still-image brightness correction parameter based upon the brightness of the target-image portion and a histogram of brightness of the overall one subject image.

By way of example, the brightness correcting device performs a brightness correction by signal processing that includes at least one of a gain adjustment and a tone correction of image data representing the correction-target subject image.

The apparatus may further comprise an image sensing device for sensing the image of a subject at a fixed period and outputting, one frame at a time at a fixed period, image data representing a number of frames of subject images. In this case, the target image detecting device would detect the target-image portion from within one subject image constituting a number of frames of subject images represented by the subject-image data that is output from the image sensing device, by way of example. The brightness correcting device would be an exposure control device for controlling amount of exposure of the correction-target subject image based upon the moving-image brightness correction parameter calculated by the moving-image brightness correction parameter calculating device, by way of example.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a flowchart illustrating processing executed by the digital still camera according to another embodiment of the present invention.

DESCRIPTION OF THE PREFERRED EMBODIMENTS

Preferred embodiments of the present invention will now be described in detail with reference to the drawings.

Figure 1:
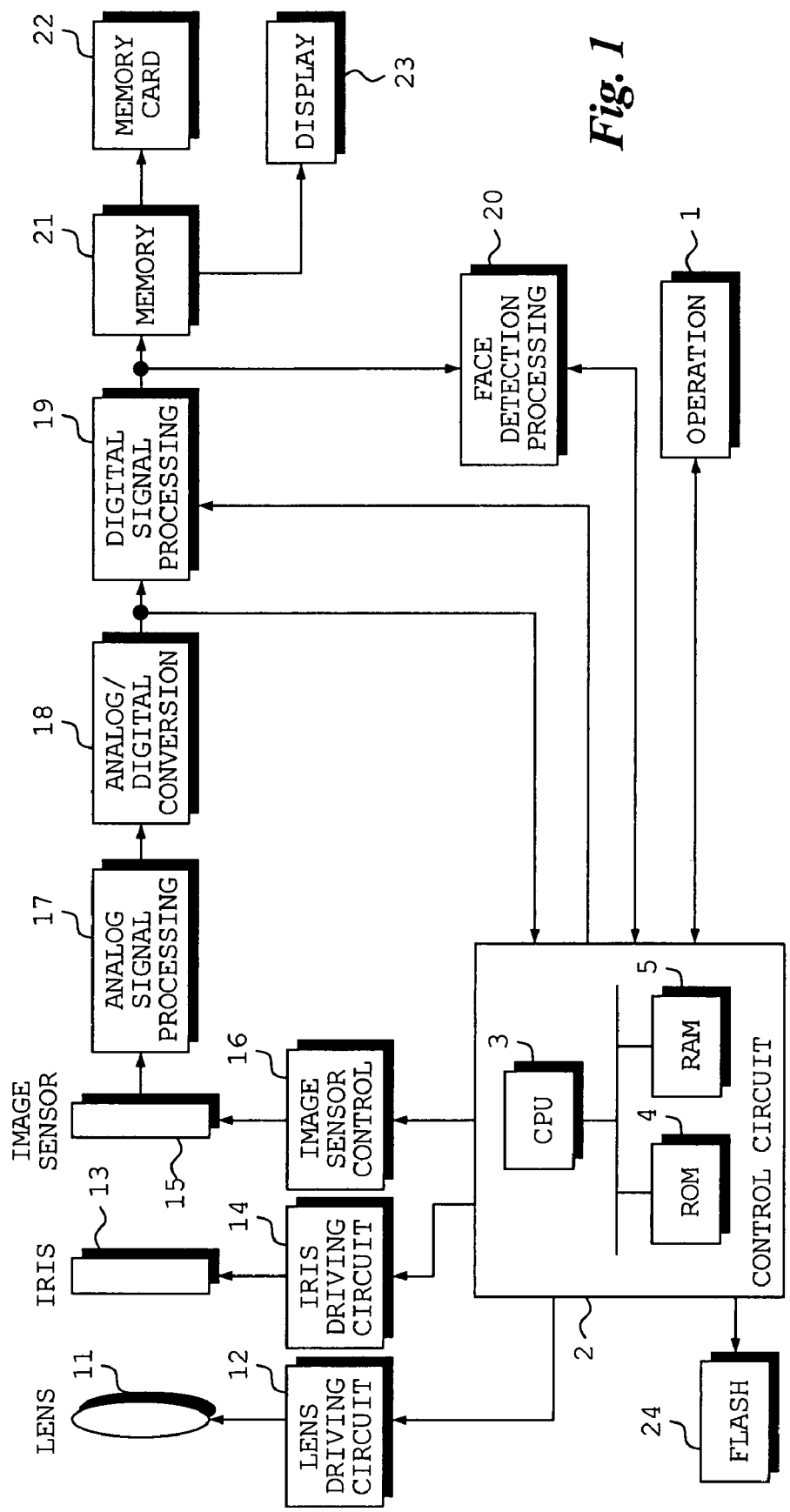
FIG. 1 is a block diagram illustrating the electrical structure of a digital still camera.

FIG. 1, which illustrates an embodiment of the invention, is a block diagram illustrating the electrical structure of a digital still camera.

The overall operation of the digital still camera is controlled by a control circuit 2. The latter includes a CPU 3, a ROM 4 and a RAM 5, which are interconnected by a bus. The digital still camera includes operating buttons 1 such as a shutter-release button of two-step stroke type, a power button, a mode setting dial, a menu button, a decide button and a so-called cross-hair button formed in such a manner that up, down, left and right arrows can be pressed. Output signals from the operating buttons 1 are input to the control circuit 2. Also connected to the control circuit 2 is a unit 24 for emitting an electronic flash when the amount of exposure falls below a fixed amount.

If an image sensing mode is set, light flux representing the image of the subject is converged by an imaging lens 11 positioned by a lens driving circuit 12. A light beam representing the image of the subject impinges upon the photoreceptor surface of an image sensor 15 such as a CCD via an iris 13 whose f-stop value is controlled by an iris driving circuit 14. The image of the subject is sensed at a fixed period by controlling the image sensor 15 using a control circuit 16 for controlling the image sensor, and an analog video signal representing the image of the subject is output from the image sensor 15 one frame at a time at a fixed period (this represents output of a moving-image signal).

An analog signal processing circuit 17 subjects the video signal to prescribed analog processing such as correlated double sampling and a white balance correction. The video signal that is output from the analog signal processing circuit 17 is converted to digital image data by an analog/digital converting circuit 18. The digital image data obtained by the conversion is input to the control circuit 2 and to a digital signal processing circuit 19. The latter executes prescribed digital signal processing such as a gain correction and gamma correction, described later.

Image data that is output from the digital signal processing circuit 19 is applied also to a display unit 23 via a memory 21. The image of the subject (a moving image or so-called "through image") obtained by image sensing performed at a fixed period is displayed on the display screen of the display unit 23.

In the digital still camera according to this embodiment, the image of a face can be detected from within the image of a subject. The digital still camera is provided with a face detecting circuit 20 for this purpose, and the image data that has been output from the digital signal processing circuit 19 is input to the face detecting circuit 20. The result of detection in the face detecting circuit 20 is, e.g., the position of the face-image portion. Data indicating the result of detection is input to the control circuit 2.

Image data representing the overall image of the subject and data indicating the result of face detection is input to the control circuit 2. Based upon the data indicating the result of face detection, data representing the face-image portion is extracted from the image data representing the overall image of the subject. On the basis of the brightness of the face in the images of the subject obtained in succession at a fixed period, the brightness of the images of the subject is corrected in such a manner that the brightness of the face-image portion in subsequent images of the subject will be appropriate and will not change suddenly, as will be described later in greater detail.

If the shutter-release button is pressed through the first step of its stroke, the image sensor 15 and iris 13 are controlled by the control circuit 2, using the data representing the overall image of the subject, in such a manner that the amount of exposure of the image sensor 15 will be appropriate (in such a manner that the image of the subject will take on an appropriate brightness). Exposure control may be performed using image data representing the face-image portion. In a case where the brightness correction is carried out by exposure control, as will be described later, control may be exercised in such a manner that the amount of exposure becomes that decided by such a brightness correction.

If the shutter-release button is pressed through the second step of its stroke, the image data that has been output from the digital signal processing circuit 19 is applied to and stored temporarily in the memory 21, as described above. The image data is read out of the memory 21 and applied to a memory card 22, whereby the image data is recorded.

Figure 2:
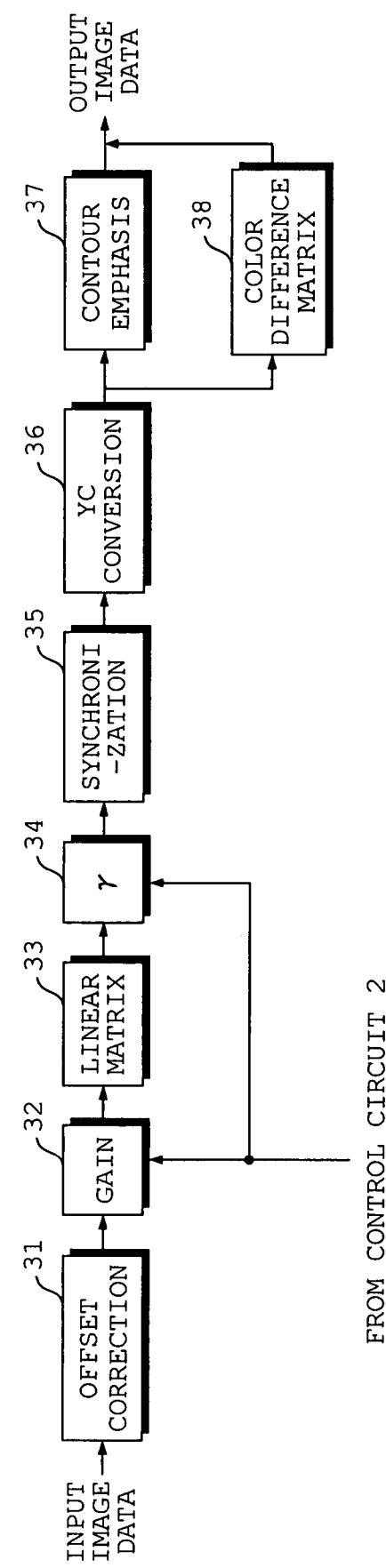
FIG. 2 is a block diagram illustrating the electrical structure of a digital signal processing circuit.

FIG. 2 is a block diagram illustrating the electrical structure of the digital signal processing circuit 19.

As mentioned above, the image data obtained by the conversion in the analog/digital converting circuit 18 is input to an offset correction circuit 31 constituting the digital signal processing circuit 19. The offset correction circuit 31 executes black-level offset processing and inputs the result to a gain correcting circuit 32. On the basis of the control signal from the control circuit 2, the gain correcting circuit 32 subjects the input image data to a gain correction and the image data inputs the result to a linear matrix circuit 33. The latter applies a color correction and inputs the result to a gamma correcting circuit 34. The image data is gamma-corrected by the gamma correcting circuit 34 based upon the control signal from the control circuit 2, and the result is input to a synchronizing circuit 35. The image data that has undergone synchronization processing in the synchronizing circuit 35 is converted to luminance data Y and color difference data C in a YC converting circuit 36. The luminance data Y is subjected to contour emphasis processing in a contour emphasizing circuit 37, and the processed data is output from the digital signal processing circuit 19. The color difference data C is further subjected to a color correction in a color difference matrix 38, and the corrected data is output from the color difference matrix 38.

In this embodiment, first a correction parameter (still-image correction parameter) for a brightness correction suited to a still image is calculated in order to carry out a brightness correction suited to a moving image. The still-image correction parameter is calculated based upon the brightness of a face-image portion in the image of the subject and a histogram of brightness of the overall image of the subject. Of course, only the brightness of the face-image portion in the image of the subject may be used, or use may be made of a representative value of brightness of the overall image of the subject instead of using a histogram of brightness of the overall image of the subject.

Figure 3:
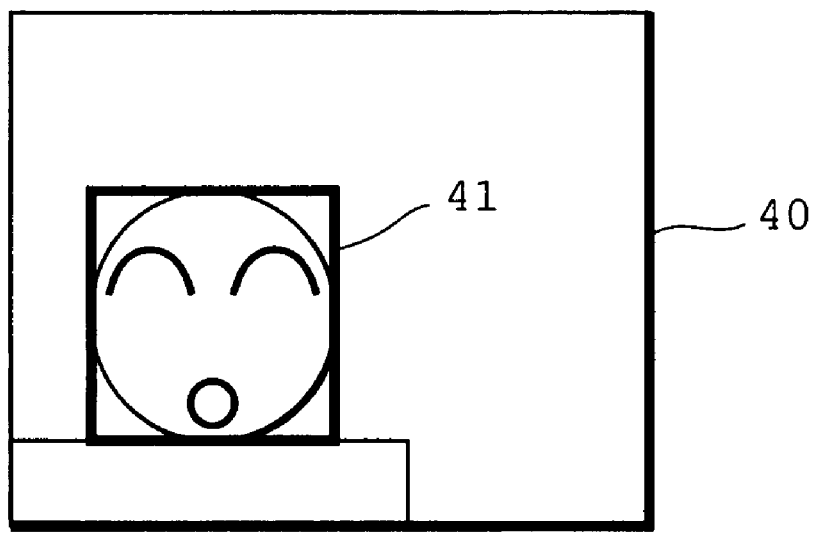
FIG. 3 illustrates an example of the image of a subject.

FIG. 3 illustrates an example of one frame of the image of a subject from among a number of frames of images of the subject obtained by sensing the image of the subject at a fixed period.

A face-image portion 41 is detected from a subject image 40 by applying face detection processing to the subject image 40 in the face detecting circuit 20. Image data (luminance data) representing the face-image portion 41 detected is applied to the control circuit 2, which proceeds to calculate the brightness of the face-image portion 41.

Figure 4:
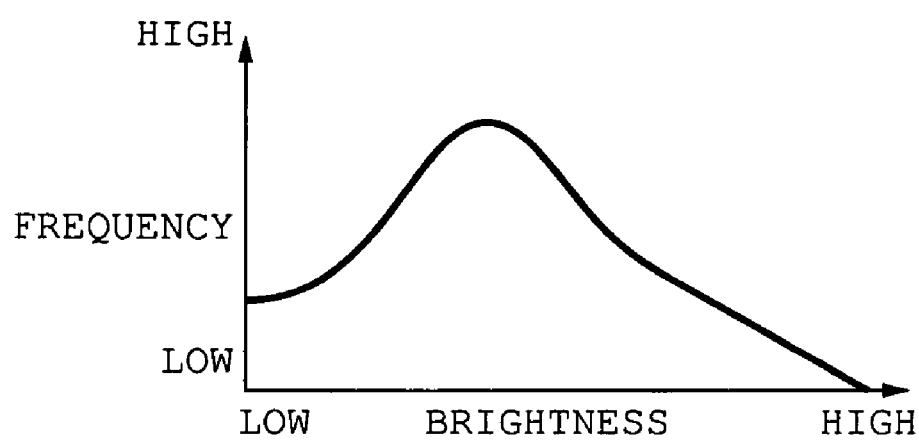
FIG. 4 is a histogram of brightness of the image of the subject.

FIG. 4 illustrates a histogram of brightness of the subject image 40.

The image data that has been output from the analog/digital converting circuit 18 is input to the control circuit 2, as set forth above. The histogram regarding the subject image 40 is generated in the control circuit 2 in the manner shown in FIG. 4.

When the brightness of the face-image portion 41 of subject image 40 and the histogram of brightness of the subject image 40 are obtained, a still-image brightness correction parameter is calculated from the brightness of the face-image portion 41 and the histogram of brightness of the subject image 40. The still-image brightness correction parameter is made a suitable parameter in order to correct brightness when the subject image 40 is considered simply as one frame of a still image and not as one frame among moving images.

Figure 5:
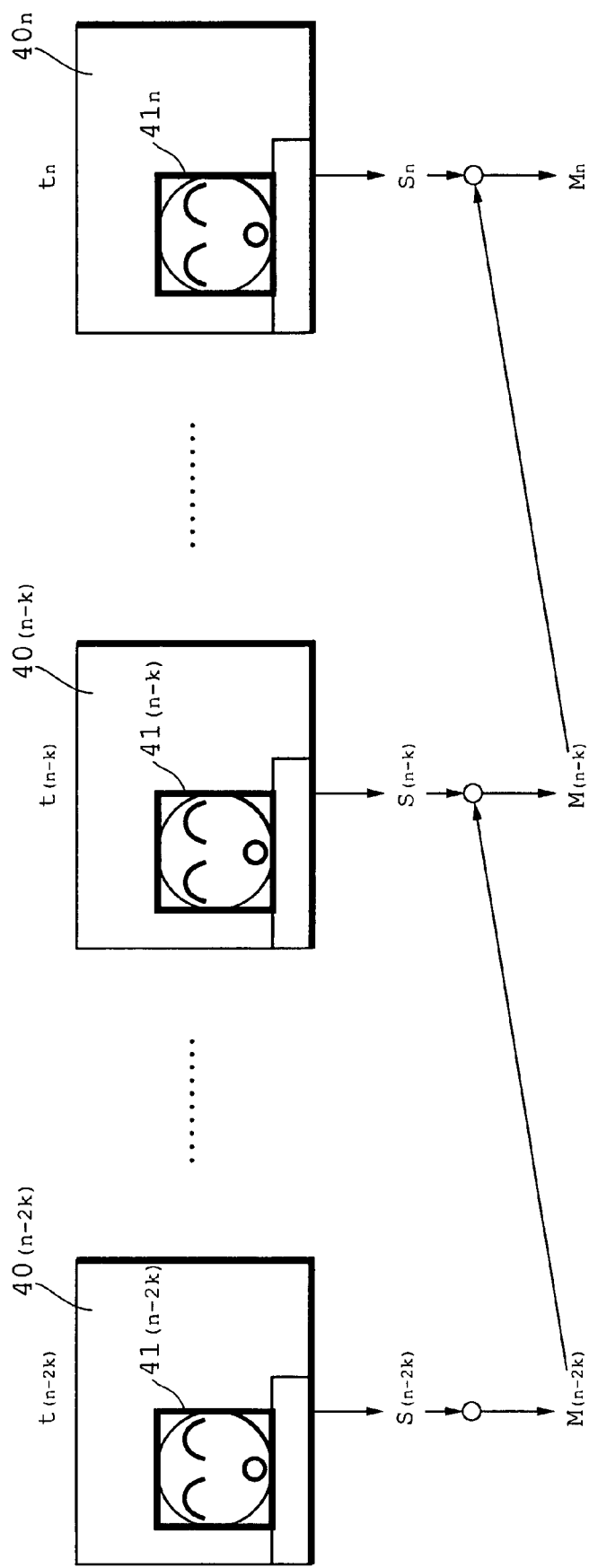
FIG. 5 illustrates an example of images of a subject obtained by image sensing at a fixed period.

FIG. 5 illustrates images of a subject which are some of a number of frames of images of the subject obtained by sensing the image of the subject at a fixed period.

By sensing the image of the subject at a fixed period, subject images $40_{(n-2k)}$, $40_{(n-k)}$ and $40_n$ are obtained at times $t_{(n-2k)}$, $t_{(n-k)}$ and $t_n$, respectively. Naturally, if variable k=1 holds, then the subject images $40_{(n-2k)}$, $40_{(n-k)}$ and $40_n$ will be adjacent contiguous frames of subject images. If the variable k is equal to or greater than 2, then subject images will be present between subject images $40_{(n-2k)}$ and $40_{(n-k)}$ and between subject images $40_{(n-k)}$ and $40_n$. By applying face detection processing to the subject images $40_{(n-2k)}$, $40_{(n-k)}$ and $40_n$, face-image portions $41_{(n-2k)}$, $41_{(n-k)}$ and $41_n$ are detected.

The face-image portions $41_{(n-2k)}$, $41_{(n-k)}$ and $41_n$ are detected in the subject images $40_{(n-2k)}$, $40_{(n-k)}$ and $40_n$, respectively, and the brightnesses of the face-image portions $41_{(n-2k)}$, $41_{(n-k)}$ and $41_n$ are calculated in the manner described above. Further, brightness histograms of respective ones of the subject images $40_{(n-2k)}$, $40_{(n-k)}$ and $40_n$ are also found in the manner described above. Still-image brightness correction parameters $S_{(n-2k)}$, $S_{(n-k)}$ and $S_n$ of the subject images $40_{(n-2k)}$, $40_{(n-k)}$ and $40_n$, respectively, are calculated.

In a case where a brightness correction parameter (moving-image brightness correction parameter) that takes a moving image into consideration is calculated in this embodiment, use is made of the still-image brightness correction parameter and a moving-image brightness correction parameter calculated using the subject image of frame prior to that of the subject image for which the still-image brightness correction parameter was calculated. For example, in a case where a moving-image brightness correction parameter $M_n$ is calculated from the subject image $40_n$, use is made of the still-image brightness correction parameter $S_n$ obtained from the subject image $40_n$ and a moving-image brightness correction parameter $M_{(n-k)}$ (an adjustment parameter) that was calculated using the subject image $40_{(n-k)}$ of the frame preceding the subject image $40_n$. A general expression for calculating the moving-image brightness correction parameter $M_n$ is represented by Equation (1) below.

$$M_n = \sum_{i=n-mk}^{n} a_i \cdot S_i - \sum_{i=n-mk}^{n-k} b_i \cdot M_i \quad \text{Equation (1)}$$

More specifically, this is represented by Equation (2) or (3) below.

$$M_n = M_{(n-k)} + \text{Min}\{S_n - M_{(n-k)}, \text{steplimit}\} \quad \text{Equation (2)}$$

where $S_n - M_{(n-k)} > 0$ holds;

$$M_n = M_{(n-k)} - \text{Min}\{S_n - M_{(n-k)}, \text{steplimit}\} \quad \text{Equation (3)}$$

where $S_n - M_{(n-k)} < 0$ or $S_n - M_{(n-k)} = 0$ holds.

In Equations (2) and (3), $\text{Min}\{S_n - M_{(n-k)}, \text{steplimit}\}$ indicates that the smaller of $S_n - M_{(n-k)}$ or steplimit (a prescribed limit value) is selected. Accordingly, in Equation (2) or (3), the moving-image brightness correction parameter $M_n$ neither increases nor decreases the previously calculated moving-image brightness correction parameter $M_{(n-k)}$ by more than a value stipulated by the prescribed limit value steplimit. Thus a sudden change in brightness can be suppressed even in a case where brightness has been corrected using the moving-image brightness correction parameter $M_n$.

By using the moving-image brightness correction parameter $M_n$ thus calculated, the brightness of a subject image obtained subsequent to calculation of the moving-image brightness correction parameter $M_n$ is corrected. The brightness correction parameter is not simply calculated taking the brightness of the face-image portion into consideration. Rather, the brightness of a subject image obtained previously is taken into consideration to correct the brightness of the subject image that follows. As a result, a variation in brightness can be precluded even in subject images that appear successively in the manner of a moving image. It goes without saying that a moving-image brightness correction parameter is calculated in a similar manner also with regard to other subject images and not just the subject image $40_n$.

Figure 6:
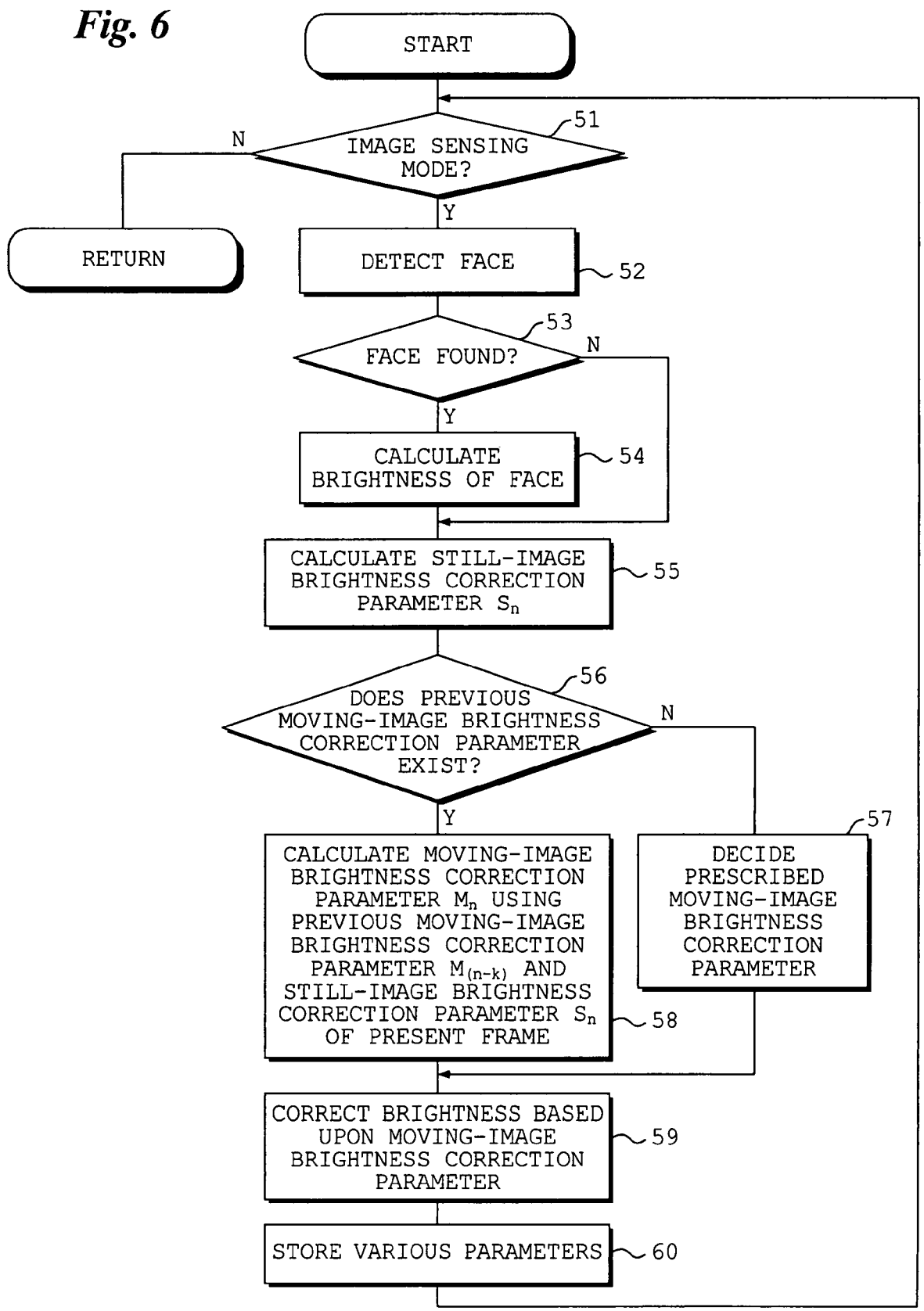
FIG. 6 is a flowchart illustrating processing executed by the digital still camera.

FIG. 6 is a flowchart illustrating processing executed by the digital still camera.

If the image sensing mode is set ("YES" at step 51), the subject is imaged and images of the subject are obtained in sequence. The portion that is the face image is detected from the subject images obtained (step 52). If a face image is thus detected ("YES" at step 53), the brightness of the face-image portion is calculated (step 54). If a face-image portion is not detected ("NO" at step 53), then the processing of step 54 is skipped.

Next, the still-image brightness correction parameter $S_n$ of the subject image of a certain frame is calculated (step 55). Then, whether or not a moving-image brightness correction parameter calculated previously exists is determined (step 56). If this parameter does not exist ("NO" at step 56), then the parameter is decided upon as a prescribed moving-image brightness correction parameter (step 57). If the parameter does exist ("YES" at step 56), then, as described above, a new moving-image brightness correction parameter $M_n$ is calculated from the previously calculated moving-image brightness correction parameter $M_{(n-k)}$ and the still-image brightness correction parameter $S_n$ that was calculated from the subject image of the present frame (step 58).

By using the moving-image brightness correction parameter decided or calculated, a brightness correction is applied to the subject image obtained after the decision or calculation of this parameter (step 59). The decided or calculated moving-image brightness correction parameter is stored in order to calculate the next moving-image brightness correction parameter (step 60).

Figure 7:
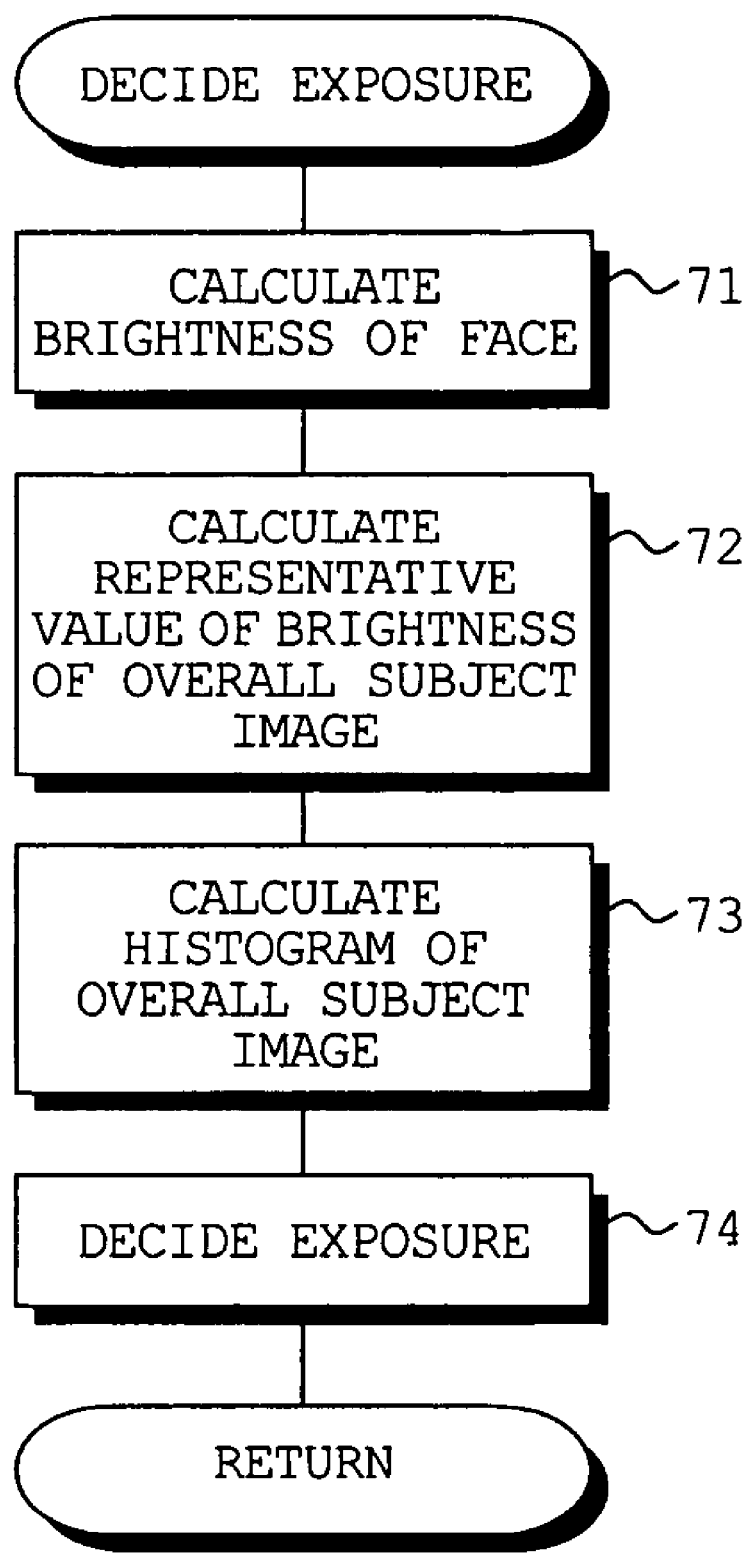
FIG. 7 is a flowchart illustrating processing for deciding exposure.

FIG. 7 is a flowchart illustrating processing for deciding exposure. An amount of exposure decided in this flowchart is one example of the still-image brightness correction parameter described above.

First, brightness Evface of the face-image portion is calculated (step 71). Next, a brightness representative value EVfull and histogram of the overall subject image are calculated (steps 72, 73). A brightness EVtotal for exposure control is decided from each of the values obtained (step 74).

Figure 8:
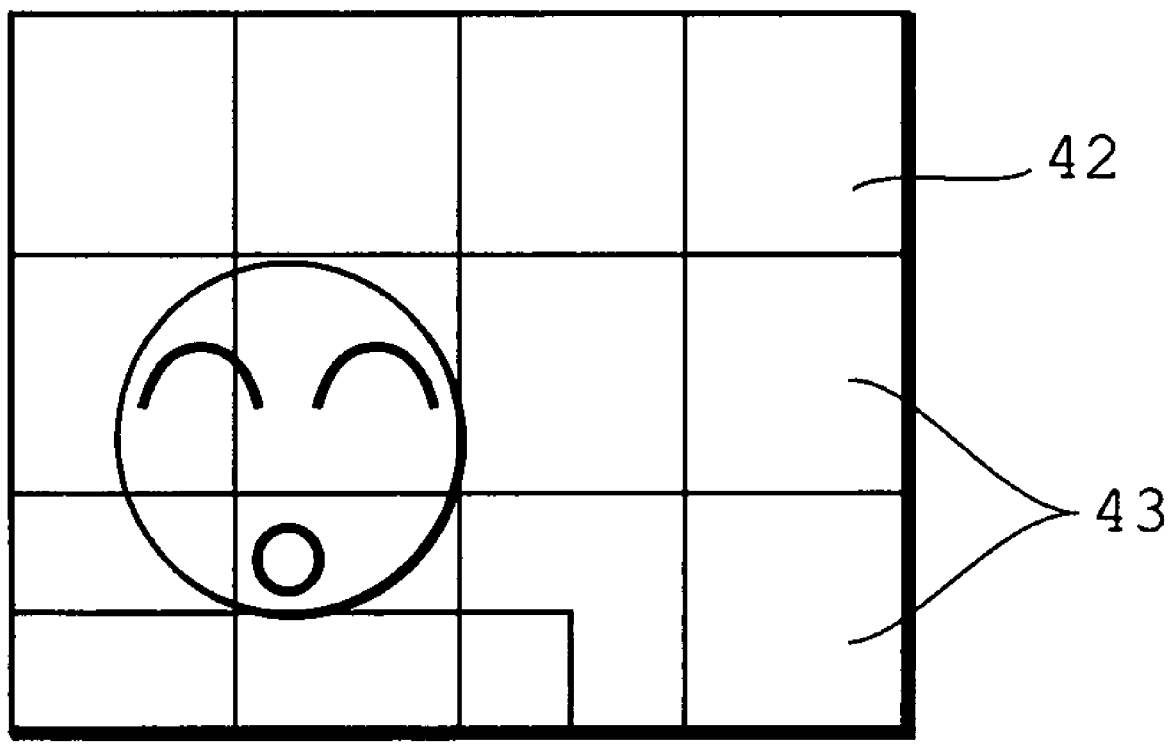
FIG. 8 illustrates an example of the image of a subject.

In a case where a subject image 42 has been divided into a number of areas 43, as illustrated in FIG. 8, the brightness EVtotal for exposure control is obtained from Equation (4) below assuming that EVarea represents photometric values of the areas 43 obtained by division.

$$EVtotal = f(EVface, EVarea[i]) \quad \text{Equation (4)}$$

The brightness EVtotal for exposure control thus obtained can be utilized as one example of the still-image brightness correction parameter mentioned above. Furthermore, in a case where the obtained brightness EVtotal for exposure control has been utilized as the still-image brightness correction parameter, a brightness corresponding to a moving-image brightness correction parameter can be calculated using the brightness EVtotal in the manner described above. A brightness correction suited to the moving image is carried out by performing exposure control, such as control of f-stop value and shutter speed, in such a manner that a brightness (EV value) corresponding to the calculated moving-image brightness correction parameter will be obtained.

Figure 9:
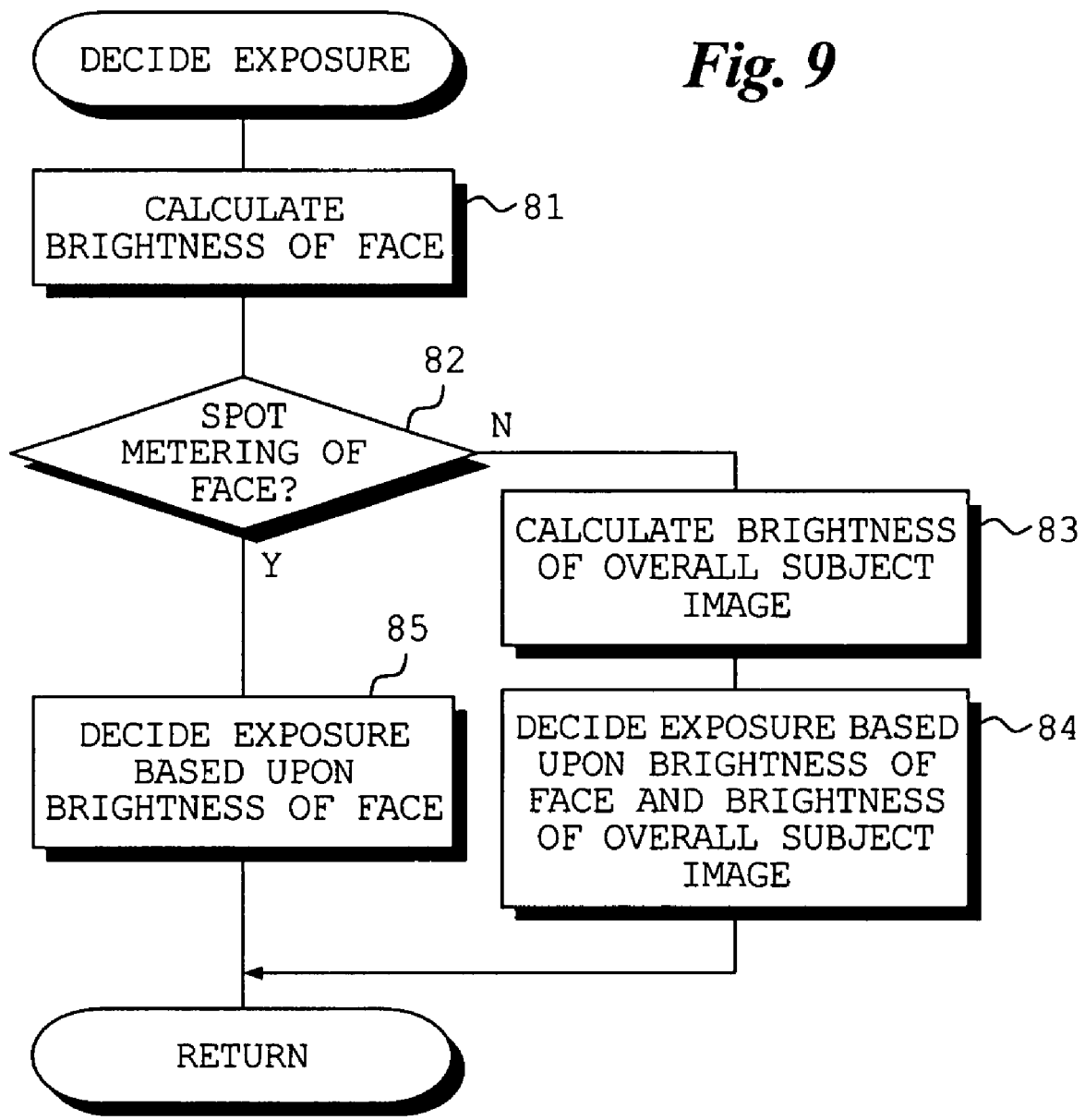
FIG. 9 is a flowchart illustrating another example of processing for deciding exposure.

FIG. 9 is a flowchart illustrating another example of processing for deciding exposure.

First, brightness of the face-image portion is calculated (step 81).

If spot metering of the face has not been set ("NO" at step 82), then the amount of exposure is decided from the face-image portion and the overall subject image. To achieve this, the brightness of the overall subject image is calculated (step 83). The amount of exposure is then decided based upon the calculated brightness of the overall subject image and the brightness of the face-image portion (step 84).

If we let EVfull and EVface represent the brightness of the overall subject image and the brightness of the face-image portion, respectively, then the exposure amount EVtotal can be calculated from Equation (5) below, where wface and wfull are weighting coefficients.

$$EV_{total} = \log_2 \left[ \frac{w_{face} \cdot 2^{EV_{face}} + w_{full} \cdot 2^{EV_{full}}}{w_{face} + w_{full}} \right] \quad \text{Equation (5)}$$

If spot metering of the face has been set ("YES" at step 82), then the amount of exposure is decided based upon the brightness of the face-image portion (step 85).

The brightness correction parameter may be a gain coefficient.

Figure 10:
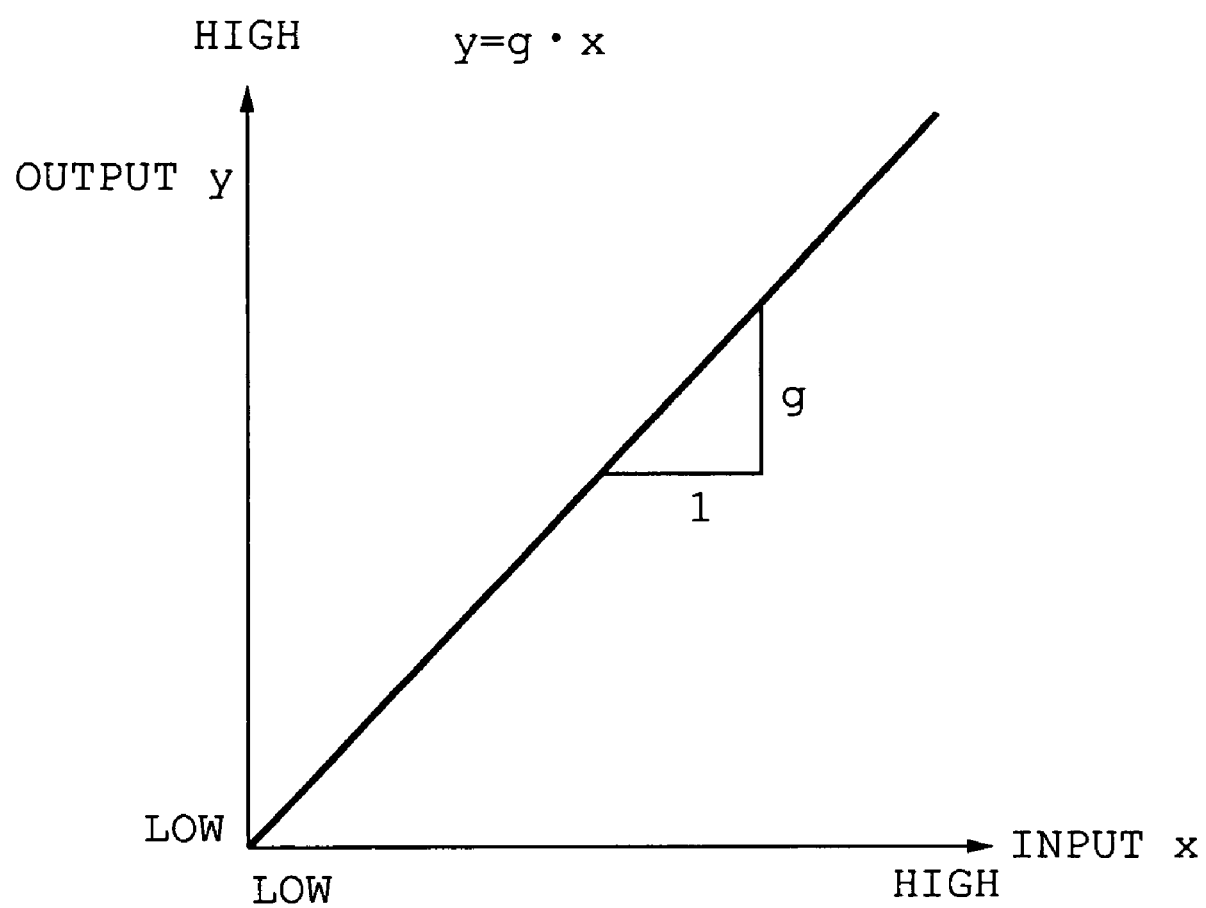
FIGS. 10 and 11 illustrate gain correction curves.

FIG. 10 illustrates the input/output characteristic of the gain correcting circuit 32.

If we let x, y and g represent the input, output and gain coefficient, respectively, of the gain correcting circuit 32, then the input and output will be represented by Equation (6) below.

$$y = g \cdot x \quad \text{Equation 6)}$$

The gain coefficient g is decided in such a manner that the brightness of the face-image portion in one frame of the subject image constituting the moving image will be the appropriate brightness (the gain coefficient g thus decided corresponds to the above-described still-image brightness correction parameter), and the gain coefficient corresponding to the moving-image brightness correction parameter is decided in the control circuit 2 from the gain coefficient g. It will be understood that by applying the decided gain coefficient to the gain correcting circuit 32 from the control circuit 2, a brightness correction suited to the moving image is applied in the gain correcting circuit 32.

Figure 11:
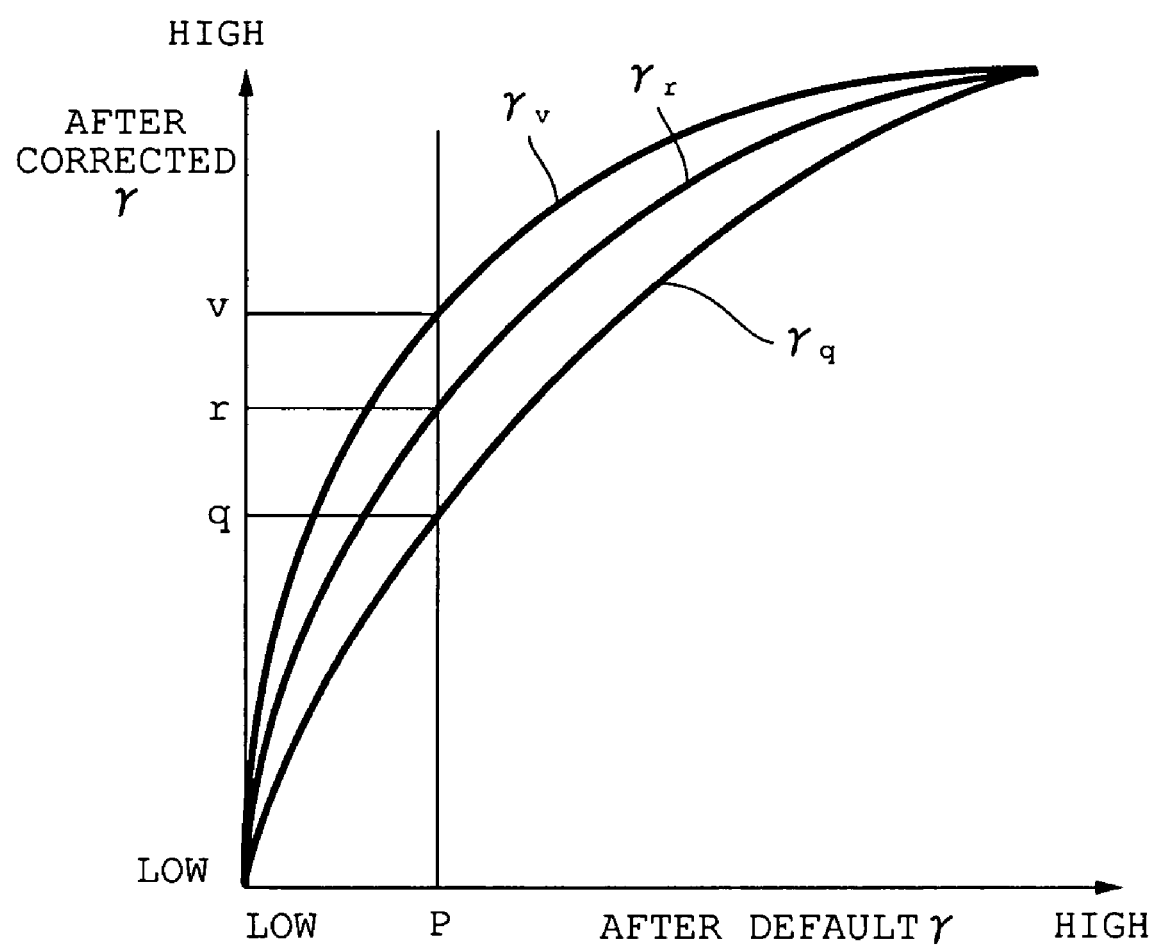

FIG. 11 illustrates an example of a gamma correction curve.

Result after application of an ordinary gamma correction ("after default γ") is plotted along the horizontal axis, which is the input axis, and result after application of a gamma correction that has undergone a brightness correction ("after corrected γ") is plotted along the vertical axis, which is the output axis.

Let an input that corresponds to brightness of a face-image portion be represented by a control point P. A target value v (the target value v corresponds to the still-image brightness correction parameter $S_n$ described above) in a case where the value at the control point P has undergone a brightness correction suited to a still image is calculated. Furthermore, a moving-image brightness target value q calculated previously is utilized [the target value q corresponds to the above-mentioned moving-image brightness correction parameter $M_{(n-k)}$ of the previous frame]. A moving-image brightness target value r (the target value r corresponds to the above-mentioned moving-image brightness correction parameter $M_n$) is calculated using the calculated still-image brightness target value v and the moving-image brightness target value q calculated previously.

The relationship among the target values q, v, r corresponding to Equations (2) and (3) cited above is as follows, where s represents a limit value: r=q+min(v−s) in a case where v−q>0 holds, and r=q−min(v−s) in a case where v−q<0 or v−q=0 holds.

If the moving-image brightness target value r is thus calculated, then a gamma correction curve $\gamma_r$, which is the moving-image brightness correction parameter, is obtained using spline interpolation based upon the origin (0,0), the values (P,v) of the control point P and brightness target value, and the maximum value (xmax, ymax) of the gamma correction curve. Image data that has undergone the gamma correction that is based upon default gamma correction curve is subjected to a gamma correction that is based upon the calculated gamma correction curve $\gamma_r$, whereby a brightness correction suited to the moving image is carried out in the manner described above. Further, in order to facilitate understanding of the description, gamma correction curves $\gamma_v$ and $\gamma_q$ that pass through the target values v and q, respectively, are also illustrated in FIG. 11.

Figure 12:
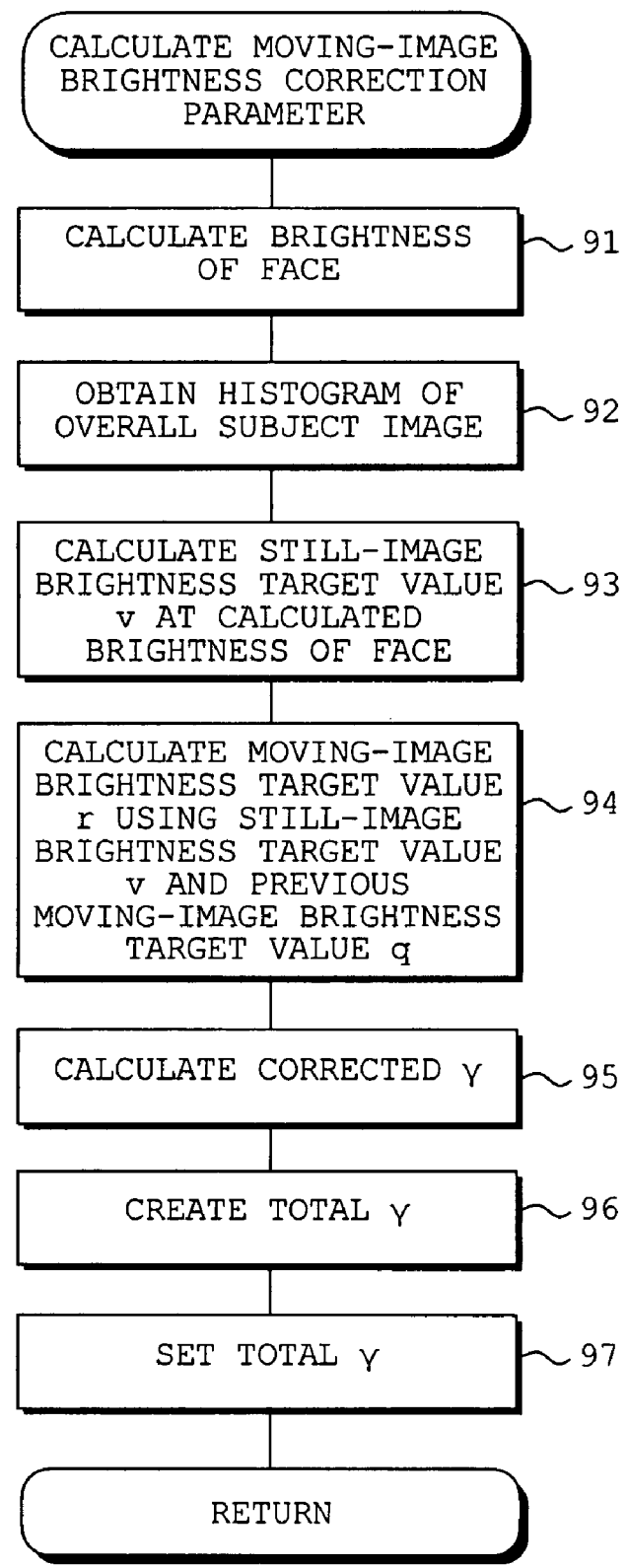
FIG. 12 is a flowchart illustrating processing for calculating a moving-image brightness correction parameter.

FIG. 12 is a flowchart illustrating processing for calculating the moving-image brightness correction parameter in a case where a gamma correction is utilized.

First, the brightness of the face-image portion is calculated (step 91) and then the histogram of the overall image of the subject is found (step 92).

Next, step 93 calls for the calculation of the still-image brightness target value v prevailing after a gamma correction that will result in appropriate brightness in a case where the calculated brightness of the face-image portion has been subjected to a gamma correction, as described above. Furthermore, the moving-image brightness target value r is calculated using the calculated still-image brightness target value v and the moving-image brightness target value calculated previously (step 94).

The gamma correction curve $\gamma_r$, which is the moving-image brightness correction parameter, is obtained using spline interpolation based upon the origin (0,0), the values (P,v) of the control point P and brightness target value, and the maximum value (xmax, ymax) of the gamma correction curve (step 95). Next, step 96 calls for the creation of a total gamma correction curve, which is obtained by combining the default gamma correction curve and the gamma correction curve $\gamma_r$, which is the moving-image brightness correction parameter. The data indicating the created total gamma correction curve is set in the above-mentioned gamma correcting circuit 34 (step 97). Thus, a brightness correction suited to the moving image is carried out in the gamma correcting circuit 34.

Figure 13:
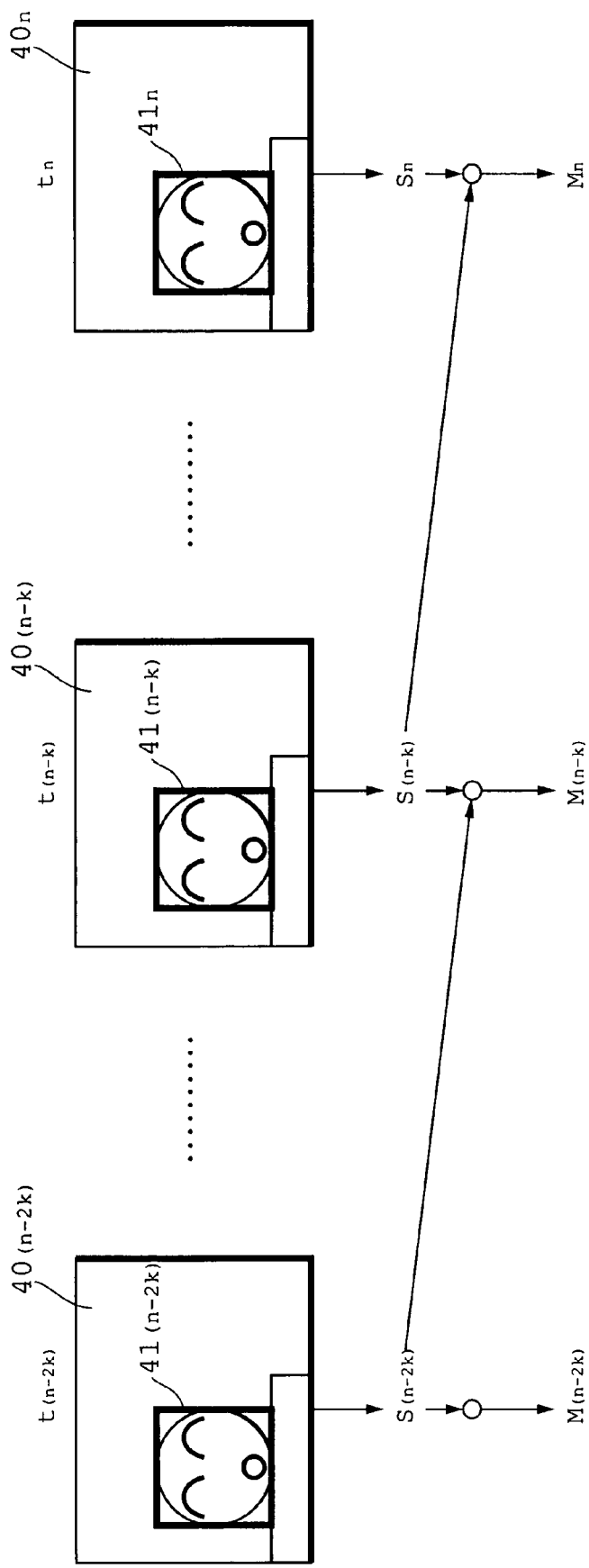
FIG. 13 illustrates an example of images of a subject obtained by image sensing at a fixed period according to another embodiment of the present invention.

FIGS. 13 and 14 illustrate another embodiment of the present invention.

FIG. 13 illustrates images of a subject which are some of a number of frames of images of the subject obtained by sensing the image of the subject at a fixed period. FIG. 13 corresponds to FIG. 5. Items in FIG. 13 identical with those shown in FIG. 5 are designated by like reference characters and need not be described again.

In FIG. 5, a moving-image brightness correction parameter is generated from a newly generated still-image brightness correction parameter and a moving-image brightness correction parameter generated previously. In FIG. 13, however, a moving-image brightness correction parameter is generated from a newly generated still-image brightness correction parameter and a still-image brightness correction parameter generated previously.

The still-image brightness correction parameter $S_n$ is calculated from a subject image $40_n$ obtained at time $t_n$. The moving-image brightness correction parameter $M_n$ is calculated from the calculated still-image brightness correction parameter $S_n$ and the still-image brightness correction parameter $S_{(n-k)}$ calculated from the subject image $40_n$ obtained at time $t_{(n-1)}$ preceding time $t_n$. A general expression for calculating the moving-image brightness correction parameter $M_n$ is represented by Equation (7) below.

$$M_n = \sum_{i=n-mk}^{n} w_i \cdot S_i \quad \text{Equation (7)}$$

More specifically, Equation (7) is represented by Equation (8) below, where $w_{(n-k)}$, $w_n$ are weighting coefficients.

$$M_n = w_{(n-k)} \cdot S_{(n-k)} + w_n \cdot S_n \quad \text{Equation (8)}$$

A moving-image brightness correction parameter can thus also be calculated using still-image brightness correction parameters.

FIG. 14 is an example of a flowchart illustrating processing executed by the digital still camera. Processing steps in FIG. 14 identical with those shown in FIG. 6 are designated by like step numbers and need not be described again.

In the processing shown in FIG. 6, a new moving-image brightness correction parameter is generated from a still-image brightness correction parameter and a moving-image brightness correction parameter generated previously. According to the processing illustrated in FIG. 14, however, the moving-image brightness correction parameter $M_n$ is generated from a previous still-image brightness correction parameter $S_{(n-k)}$ and the still-image brightness correction parameter $S_n$ of the present frame (step 61). By using the moving-image brightness correction parameter $M_n$ generated, the brightness of the subject image obtained subsequently is corrected.

In the foregoing embodiments, a moving-image brightness correction parameter is calculated in a case where the digital still camera has been set to the image sensing mode, and a brightness correction suited to a moving image is performed using the brightness correction parameter calculated. However, a brightness correction suited to a moving image can also be performed in similar fashion in a playback mode and not the image sensing mode. For example, moving image data that has been recorded on the memory card 22 can be read out and brightness correction processing can be applied to the moving image data read out.

Further, the above-described brightness correction processing can also be executed by generating a program for the above-described brightness correction processing and installing the program in a digital still camera. In a case where such a program is installed in a digital still camera, the program would be recorded on the memory card 22 in advance and read from the memory card 22 by the digital still camera.

Although the processing set forth above is executed in a digital still camera, it goes without saying that the processing can also be implemented by devices other than a digital still camera, e.g., a movie video camera, a personal computer that reproduces image data, or a playback apparatus. In a case where the processing is implemented by a personal computer or the like, the program for implementing the above-described processing would be stored on a recording medium such as a CD-ROM (Compact Disk—Read-Only Memory) and installed in the personal computer from the recording medium.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for correcting brightness of a moving image, comprising:
    a face image detecting device for detecting a face-image portion from within one subject image constituting a number of frames of subject images applied in succession one frame at a time at a fixed period;
    a still-image brightness correction parameter calculating device for calculating a still-image brightness correction parameter based upon brightness of the face-image portion detected by said face image detecting device;
    an adjustment parameter calculating device for calculating an adjustment parameter, which adjusts the still-image brightness correction parameter calculated by said still-image brightness correction parameter calculating device, based upon another subject image preceding the one subject image;
    a moving-image brightness correction parameter calculating device for calculating a moving-image brightness correction parameter by adjusting the still-image brightness correction parameter, which has been calculated by said still-image brightness correction parameter, using the adjustment parameter calculated by said adjustment parameter calculating device; and
    a brightness correcting device for correcting the brightness of a correction-target subject image, which is subsequent to the one subject image, using the moving-image brightness correction parameter calculated by said moving-image brightness correction parameter calculating device.

2. The apparatus according to claim 1, wherein said adjustment parameter calculating device calculates the moving-image brightness correction parameter, which is obtained based upon the other subject image.

3. The apparatus according to claim 1, wherein said adjustment parameter calculating device calculates the moving-image brightness correction parameter, which is calculated based upon the brightness of the face-image portion in the other subject image.

4. The apparatus according to claim 1, wherein the moving-image brightness correction parameter calculated by said moving-image brightness correction parameter calculating device falls within a fixed range that starts from the adjustment parameter calculated by said adjustment parameter calculating device.

5. The apparatus according to claim 1, wherein said still-image brightness correction parameter calculating device calculates the still-image brightness correction parameter based upon the brightness of the face-image portion and the brightness of the overall one subject image.

6. The apparatus according to claim 1, wherein said still-image brightness correction parameter calculating device calculates the still-image brightness correction parameter based upon the brightness of the face-image portion and a histogram of brightness of the overall one subject image.

7. The apparatus according to claim 1, wherein said brightness correcting device performs a brightness correction by signal processing that includes at least one of a gain adjustment and a tone correction of image data representing the correction-target subject image.

8. The apparatus according to claim 1, further comprising an image sensing device for sensing the image of a subject at a fixed period and outputting, one frame at a time at a fixed period, image data representing a number of frames of subject images;
    wherein said face image detecting device detects the face-image portion from within one subject image constituting a number of frames of subject images represented by the subject-image data that is output from the image sensing device; and
    said brightness correcting device is an exposure control device for controlling amount of exposure of the correction-target subject image based upon the moving-image brightness correction parameter calculated by said moving-image brightness correction parameter calculating device.

9. A method of controlling an apparatus for correcting brightness of a moving image, said method comprising the steps of:
    detecting a face-image portion from within one subject image constituting a number of frames of subject images applied in succession one frame at a time at a fixed period;
    calculating a still-image brightness correction parameter based upon brightness of the face-image portion detected;
    adjusting the calculated still-image brightness correction parameter based upon another subject image preceding the one subject image;
    calculating a moving-image brightness correction parameter by adjusting the calculated still-image brightness correction parameter using the adjustment parameter calculated; and
    correcting the brightness of a correction-target subject image, which is subsequent to the one subject image, using the moving-image brightness correction parameter calculated.

10. A computer readable recording medium storing a program for controlling an apparatus for correcting brightness of a moving image, said program comprising the steps of:
    detecting a face-image portion from within one subject image constituting a number of frames of subject images applied in succession one frame at a time at a fixed period;
    calculating a still-image brightness correction parameter based upon brightness of the face-image portion detected;
    adjusting the calculated still-image brightness correction parameter based upon another subject image preceding the one subject image;
    calculating a moving-image brightness correction parameter by adjusting the calculated still-image brightness correction parameter using the adjustment parameter calculated; and
    correcting the brightness of a correction-target subject image, which is subsequent to the one subject image, using the moving-image brightness correction parameter calculated.

* * * * *